UNITED STATES PATENT OFFICE.

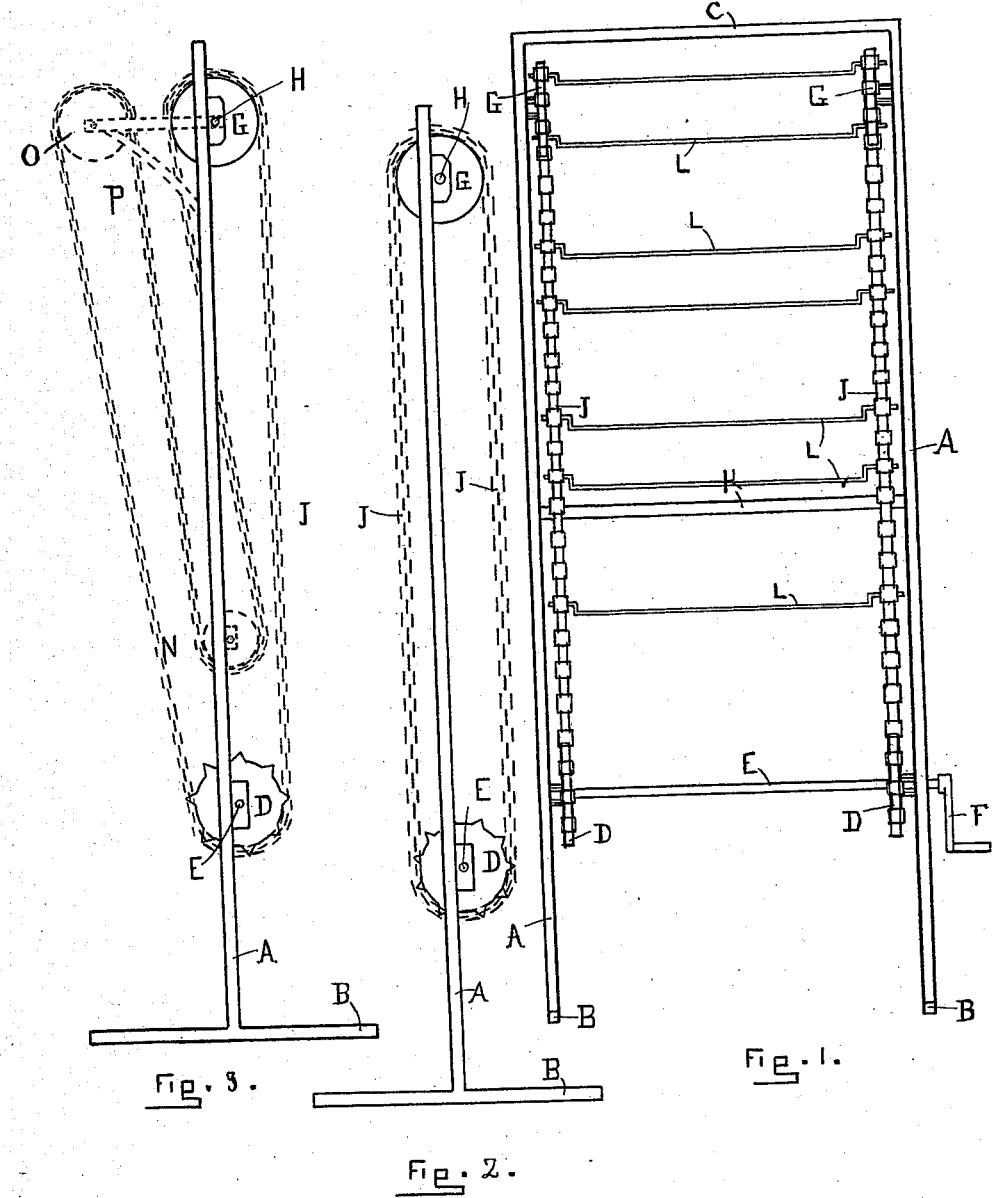

FREEMAN N. COTTLE, OF CHICAGO, ILLINOIS, ASSIGNOR TO DONLEE B. TURNER AND ANNIE R. COTTLE, BOTH OF SAME PLACE.

EXHIBITING DEVICE.

SPECIFICATION forming part of Letters Patent No. 412,698, dated October 8, 1889.

Application filed January 7, 1889. Serial No. 295,607. (No model.)

*To all whom it may concern:*

Be it known that I, FREEMAN N. COTTLE, a citizen of the United States, and a resident of Chicago, county of Cook, and State of Illinois, have invented a new and useful Improvement in Exhibiting Devices, of which the following is a specification.

My invention relates to devices for exhibiting goods and for other such similar purposes, and has for its object to provide simple and convenient mechanism whereby articles to be exhibited are suspended and vertically reciprocated.

My invention is illustrated in the accompanying drawings, wherein—

Figure 1 is a front view, Fig. 2 is a side elevation, and Fig. 3 is a side elevation of a modified form of the device.

Like parts are indicated by the same letter in all the figures.

A A are the side bars rising vertically from the foot-bars B B, and connected above by the cross-bar C, thus constituting a vertically-standing frame.

D D are sprocket-wheels on the shaft E, which shaft is journaled on the side bars of the frame, and to one end of which is secured the operating mechanism—as, for instance, the crank F.

G G are loose pulleys journaled near the upper ends of the side pieces of the frame on the short shafts H H.

J J are endless chains, belts, or the like passing one at each end of the frame over one sprocket-wheel and one pulley.

K is a cross-rod to secure the side pieces of the frame.

L L are cross-pieces journaled upon lugs secured to and traveling with the endless belts or chains. To these cross-pieces L are secured the objects to be exhibited M M.

In the modified form of the device are shown two other sets of pulleys N and O, which are mounted substantially the same as the pulleys G G, the pulley O being mounted on the bracket P.

The use and operation of my invention are as follows: The device, set up substantially as shown either in the principal view or the modification, is placed in the proper position—as, for instance, in a show-window. Any objects to be exhibited—as, for instance, gents' furnishing goods—may be secured to the cross-pieces L L in any suitable manner, or hung over them. Power is then applied to the shaft E by the crank F or by suitable piston, or by belt and pulley, the former driven by suitable engine. This will cause the shaft E, with its sprocket-wheels, to rotate, and the endless chains or belts are caused to rotate so as to reciprocate, as it were, in vertical planes, the chains traveling up on one side and down on the other, together with its cross-rods and objects attached thereto. If the modification exhibited in Fig. 3 is used, the travel of the chains is greatly extended, they first passing upward over pulley G, downward to and then upward from pulley M, and then over pulley O, and then back under pulley D. Of course these chains might be greatly varied in form, and friction-belts could be employed, so as to dispense with the sprocket-wheels, without departing from the spirit of my invention. The cross-pieces L are journaled in the lugs on the chains, so as always to permit the objects attached thereto to hang in vertical planes, and thus be freely rotated by the pulleys. These cross-pieces L may be crank-shaped at their ends, as shown.

By the arrangement of the devices, as indicated in Fig. 3 in side view, a new effect, as distinguished from the effect produced by the devices as arranged in Fig. 2, is obtained. The goods for which this exhibiting device is designed consist of light articles—such as gentlemen's furnishing goods; and when the devices are arranged as shown in Fig. 3 there are two continuous currents, so to speak, of such goods in each direction, making a confused and interesting exhibit of the goods suspended on the carrier.

What I claim as new, and desire to secure by Letters Patent, is—

In a device for exhibiting goods, the combination of the supporting-frame with a crossshaft below carrying two sprocket-wheels D D, short shafts above carrying the pulleys G G, and pulleys N between the sprocket-wheels D and pulleys G, and the pulleys O, supported at one side of the pulleys G, and endless belts J, passing over all of said sprocket-wheels and pulleys and carrying cross-bars, substantially as and for the purpose set forth.

January 4, 1889.

FREEMAN N. COTTLE.

Witnesses:
D. B. TURNER,
FRANCIS W. PARKER.